United States Patent
Brown et al.

(10) Patent No.: US 11,201,887 B1
(45) Date of Patent: Dec. 14, 2021

(54) SYSTEMS AND METHODS FOR LOW LATENCY STATEFUL THREAT DETECTION AND MITIGATION

(71) Applicant: LookingGlass Cyber Solutions, Inc., Reston, VA (US)

(72) Inventors: Bryan Wesley Brown, Baltimore, MD (US); Paolo Fabio Zaino, Brighton (GB); Allan Thomson, Pleasanton, CA (US)

(73) Assignee: LookingGlass Cyber Solutions, Inc., Reston, VA (US)

( * ) Notice: Subject to any disclaimer, the term of this patent is extended or adjusted under 35 U.S.C. 154(b) by 0 days.

(21) Appl. No.: 17/209,577

(22) Filed: Mar. 23, 2021

(51) Int. Cl.
*H04L 29/06* (2006.01)

(52) U.S. Cl.
CPC .............................. *H04L 63/1425* (2013.01)

(58) Field of Classification Search
CPC .................................................. H04L 63/1425
USPC .......................................................... 726/23
See application file for complete search history.

(56) References Cited

U.S. PATENT DOCUMENTS

| | | | | |
|---|---|---|---|---|
| 7,454,499 | B2* | 11/2008 | Cantrell | H04L 43/00 370/394 |
| 7,725,934 | B2* | 5/2010 | Kumar | H04L 63/0245 726/22 |
| 8,301,786 | B2* | 10/2012 | Reguraman | H04L 45/00 709/228 |
| 9,405,640 | B2* | 8/2016 | Sreenivasan | H04L 69/40 |
| 10,009,291 | B1* | 6/2018 | Singh | H04L 47/805 |
| 10,491,611 | B2* | 11/2019 | Caldwell | H04L 63/0236 |
| 10,798,110 | B2* | 10/2020 | Song | H04L 63/1416 |
| 2007/0050846 | A1* | 3/2007 | Xie | H04L 63/0245 726/22 |
| 2010/0095367 | A1* | 4/2010 | Narayanaswamy | H04L 63/20 726/12 |
| 2012/0079101 | A1* | 3/2012 | Muppala | H04L 63/1425 709/224 |
| 2016/0036839 | A1* | 2/2016 | Shimizu | H04L 63/1416 726/23 |
| 2016/0359913 | A1* | 12/2016 | Gupta | G06F 9/45558 |
| 2017/0126718 | A1* | 5/2017 | Baradaran | H04L 63/0281 |
| 2018/0254921 | A1* | 9/2018 | Xu | H04L 47/2483 |
| 2019/0164086 | A1* | 5/2019 | Amit | H04L 63/1466 |
| 2020/0133731 | A1* | 4/2020 | Barbara | G06F 9/5011 |
| 2021/0144073 | A1* | 5/2021 | Gupta | H04J 3/0661 |

* cited by examiner

*Primary Examiner* — Badrinarayanan (74) *Attorney, Agent, or Firm* — Bookoff McAndrews, PLLC (57) ABSTRACT

Disclosed are systems and methods for securing a network. A method may include obtaining, by a detection engine, an encapsulated image defining an action for a predetermined data packet of interest; determining, by the detection engine, that the action defined by the encapsulated image should be applied to one or more data packets accessed by the detection engine; generating and deploying, by the detection engine, an action state including one or more attributes associated with the accessed data packet and the encapsulated image; determining, at a first execution engine executing parallel with the detection engine, that the one or more data packets comprises attributes matching the one or more attributes included in the deployed action state; and executing, by the first execution engine, the action included in the deployed action state on a received data packet to generate a processed data packet.

18 Claims, 6 Drawing Sheets

SYSTEMS AND METHODS FOR LOW LATENCY STATEFUL THREAT DETECTION AND MITIGATION

DETAILED DESCRIPTION

Technical Field

The present disclosure relates to systems and methods of securing a network and, more particularly, to systems and methods of low latency deployment of threat detection and mitigation.

BACKGROUND

Some methods and systems of securing a network are mostly based on hardware. One of the fundamental problems with hardware-based security is that it lacks the ability to perform computationally complex and intensive processing for threat detection, for example, where multiple sources have to be correlated before deciding that a data flow contains a threat, in addition to performing threat mitigation based on such detections. Moreover, conventional methods and systems typically provide limited options to dynamically program and update. Due to the use of high data rates (e.g., 100 gbps), it has become insufficient to utilize conventional methods and systems by simply applying more computing resources to threat detection/mitigation without considering how those computing resources may be used in an efficient and effective manner while keeping up with the high throughput demands of higher scale network traffic.

Therefore, there is a need for systems and methods for creating relatively more complex and computation intensive processing that may leverage available hardware capabilities by incorporating horizontal and vertical scaling approaches to the use of such hardware. That is, there is a need to achieve more efficient and effective threat detection and mitigation without relying on specific hardware performance.

SUMMARY OF THE DISCLOSURE

Embodiments of the present disclosure include systems and methods for securing a network. According to some embodiments, a method of securing a network may include: obtaining, by a detection engine, an encapsulated image defining an action for a predetermined data packet of interest; determining, by the detection engine, that the action defined by the encapsulated image should be applied to one or more data packets accessed by the detection engine; as a result of determining that the action defined by the encapsulated image should be applied to the accessed data packet, generating and deploying, by the detection engine, an action state including one or more attributes associated with the accessed data packet and the encapsulated image; determining, at a first execution engine executing parallel with the detection engine, that the one or more data packets comprises attributes matching the one or more attributes included in the deployed action state; and executing, by the first execution engine, the action included in the deployed action state on a received data packet to generate a processed data packet.

In accordance with another embodiment, a system for securing a network is disclosed. The system may include: a detection engine configured to obtain an encapsulated image defining an action for a predetermined data packet of interest; determine that the action defined by the encapsulated image should be applied to one or more data packets accessed by the detection engine; and generate and deploy an action state including one or more attributes associated with the accessed data packet and the encapsulated image as a result of determining that the action defined by the encapsulated image should be applied to the accessed data packet. The system may further include a first execution engine configured to execute in parallel with the detection engine: determine that the one or more data packets comprises attributes matching the one or more attributes included in the deployed action state, and execute the action included in the deployed action state on a received data packet to generate a processed data packet.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

There is a need to provide low latency deployment and execution of dynamic threat detection and mitigation based on information that is relevant at the given time, as information may be become quickly outdated. There is also a need to introduce the ability to execute dynamic logic on specialty hardware that is directed to processing on a per-packet basis, as well as general purpose hardware that is directed to processing data streams. Network processing nodes (also referred to as heterogeneous network processing nodes) are typically specialized for processing packets in a serial fashion and such specialization may hinder the performance of network processing nodes with reference to decision making logic.

The embodiments disclosed herein address the need to achieve more dynamic and complex logic execution on a per-packet basis with higher throughput distributed across various network processing nodes. The embodiments disclosed herein provide low latency deployment and execution of dynamic threat detection and mitigation at high rates of traffic. Conventional systems that fail to provide a sufficiently low latency may cause either bottlenecking or a lost window of opportunity to mitigate threats, e.g., by modifying the traffic. Additionally, the embodiments disclosed herein provide security detection and mitigation in different computing environments (e.g., expensive, cheap, cloud-based, local, etc.). That is, the embodiments disclosed herein provide dynamic detection and mitigation logic including an associated state able to execute regardless of the underlying processor architecture in each separate compute environment. For example, the embodiments disclosed herein provide portable state and behavioral encapsulation that can migrate between network processing nodes.

Figure 1:
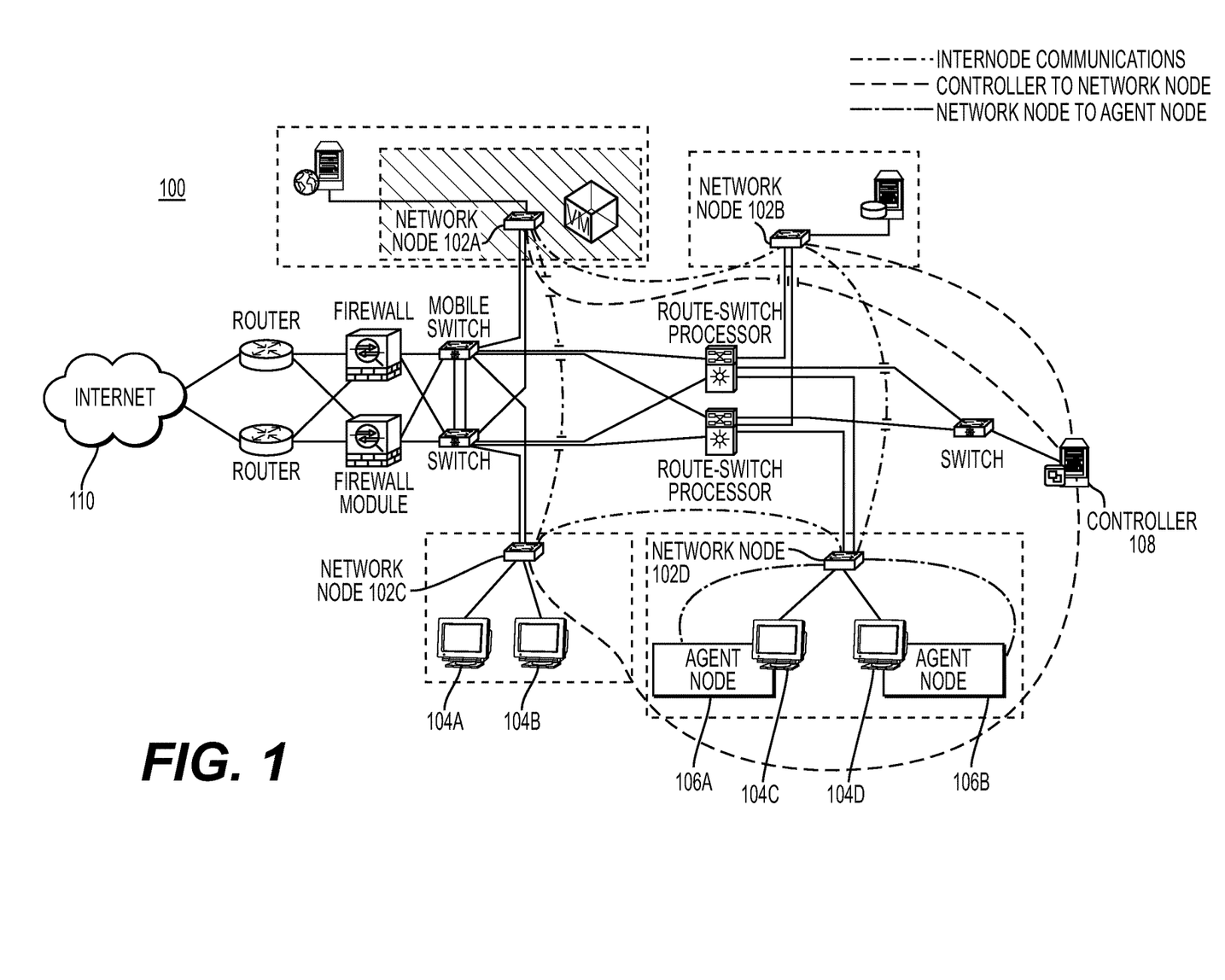
FIG. 1 depicts a schematic diagram illustrating an example of a computer network and environment within which the computer systems and methods disclosed herein are implemented according to some embodiments of the present disclosure.

Turning now to the figures, FIG. 1 shows a block diagram of a computer network and environment (hereinafter referred to as system 100) for implementing embodiments of the present disclosure, or aspects thereof. System 100 may include one or more network nodes 102A-102D, one or more endpoints 104A-104D, one or more agent nodes 106A-106B, and one or more controllers 108. As shown in FIG. 1, one or more switches, firewall modules, routers, and/or router-switch processors may interconnect the aforementioned network nodes 102A-102D, endpoints 104A-104D, agent nodes 106A-106B, and/or controllers 108. The network nodes 102A-102D, endpoints 104A-104D, agent nodes 106A-106B, and/or controllers 108 may be connected to the internet 110 through the one or more switches, firewall modules, routers, and/or router-switch processors. It is understood that the system 100 may include less than or more than the number of network nodes, endpoints, agent nodes, and/or controllers depicted in the FIG. 1 in other embodiments.

The one or more network nodes 102A-102D may form a distributed control plane. The controller 108 may be configured to manage the distributed control plane. In some embodiments, the controller 108 may manage the distributed control plane by alerting, automating, and/or implementing workflow integrations for the network nodes 102A-102D. Accordingly, the controller 108 may be referred to as a policy decision point for the system 100. For example, policies such as automation and/or workflow integrations for the one or more network nodes 102A-102D may be determined by the controller 108. In some embodiments, any combination of the one or more network nodes 102A-102D may comprise the controller 108.

The one or more network nodes 102A-102D may be configured to provide visibility to a network associated with each respective network node 102A-102D and enforce predetermined policies, e.g., automation and/or workflow integrations. For example, network nodes 102A-102D may provide connection reports, e.g., to the controller 108, to provide such visibility. In some embodiments, the controller 108 may update policies for the one or more network nodes 102A-102D based on such reports. Network nodes 102A-102D may be deployed in a transparent or a non-transparent mode, as shown below and described with reference to FIGS. 7A-7B.

In some embodiments, a network node 102A may provide access to a perimeter network including DMZ services, such as, web servers, mail servers, FTP servers, VoIP servers, and the like. In such embodiments, network node 102A may provide visibility to the perimeter network and enforce predetermined polices for the perimeter network. In some embodiments, a network node 102B, 102D may provide access to an internal network Local Area Network (LAN), such as a database workgroup, user workgroup, port, VLAN, application, network services, and the like. In such embodiments, network node 102B, 102D may provide visibility to the internal LAN and enforce predetermined policies for the internal network LAN. For example, network node 102B, 102D may transmit information including processes, users, and/or files associated with each respective network. In some embodiments, a network node 102C may be associated with (e.g., provide access to) cloud networks such as an object storage service (e.g., S3 bucket). In such embodiments, network node 102C may provide visibility to the cloud network and enforce predetermined policies for the cloud network.

In some embodiments, a network node 102D may communicate with one or more agent nodes 106A-106B associated with one or more endpoints 104C-104D. The one or more endpoints 104C-104D may include one or more network connected devices according to some embodiments. The network node 102D may obtain information regarding the one or more endpoints 104C-104D via the one or more agent nodes 106A-106B, as will be described in further detail below.

Agent nodes 106A-106B may provide visibility regarding each associated endpoint 104C-104D and may also enforce predetermined policies for the endpoints 104C-104D. In some embodiments, an agent node 106A-106B may comprise a browser plugin, a process memory-dumper, plugin framework, etc. For example, a browser plugin may be configured to detect malicious URLs inside encrypted connections. As another example, a process memory-dumper may be configured to inspect and capture in-memory and running processes. The process memory-dumper may be further configured to automate connection to a controller 108 for disassembly and forensic analysis. As yet another example, plugin framework may provide extensions for additional host-based detection, deception and mitigation capabilities via SQL query (e.g., OSQuery).

Agent nodes 106A-106B may be configured to query any software, e.g., installed on an endpoint 104C-104D, without requiring the software to be running. In some embodiments, agent nodes 106A-106B may detect vulnerable software across an organization, e.g., system 100, thereby providing useful information for asset inventory and compliance. For example, the agent nodes 106A-106B may query for and determine vulnerable versions of a web browser. In some embodiments, agent nodes 106A-106B may be configured to query any active processes and related connections. For example, the agent nodes 106A-106B may query for a specific open port. As another example, the agent nodes 106A-106B may query for any open remote ports. The agent nodes 106A-106B may be configured to query active users and associated processes and connections. For example, the agent nodes 106A-106B may query user executed specific process and retrieve the process path. As another example, the agent nodes 106A-106B may query file-less processes with remote connections. In some embodiments, the agent nodes 106A-106B may perform queries on any connected devices.

Figure 2:
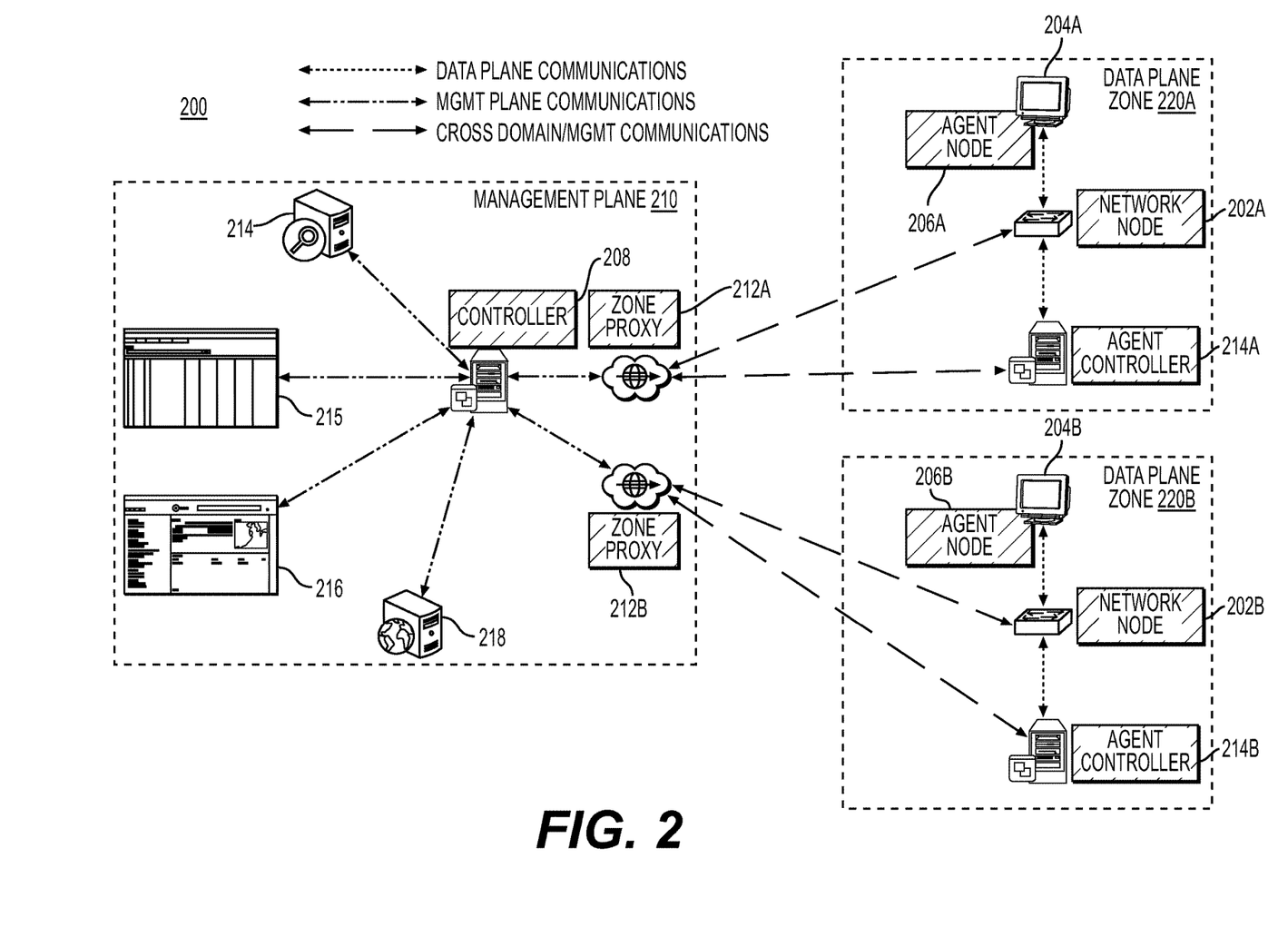
FIG. 2 depicts a schematic diagram illustrating an example of a computer network and environment within which the computer systems and methods disclosed herein are implemented according to some embodiments of the present disclosure.

FIG. 2 shows a block diagram of a computer network and environment (hereinafter referred to as system 200) for implementing embodiments of the present disclosure, or aspects thereof. As shown in FIG. 2, the system 200 may comprise a management plane 210 including a controller 208, a first zone proxy 212A, a second zone proxy 212B, security information and event management system (SIEM) 214, security operations workflow management system 215, intelligence scoring system 216, and openflow controller 218. SIEM 214 may be configured to aggregate and/or view security logs and alerts. Security operations workflow management system 215 may be configured to coordinate threat mitigation based on certain triggers, e.g., such as certain detected threats, and invoke changes in the system 200 to mitigate the threat and/or reflect the coordinated threat mitigation. Intelligence scoring system 216 may be configured to aggregate information associated with identified and/or potential threats, e.g., information provided by external systems and/or information based on threats detected and mitigated by the system 200, and determine scores for threats relevant to system 200. In some embodiments, an openflow controller 218 may be configured to use the OpenFlow protocol to connect and configured network devices, e.g., one or more switches, firewall modules, routers, and/or router-switch processors as depicted in FIG. 1, to determine optimal paths for network traffic. It is understood that the openflow controller 218 may be any appropriate software-defined network (SDN) controller in some embodiments. System 200 may further comprise one or more data plane zones 220A-220B. As shown in FIG. 2, each data plane zone 220A-220B may include a network node 202A-202B, an endpoint 204A-204B, an agent node 206A-206B, and an agent controller 214A-214B. An agent controller 214A-214B may be configured to communicate with a zone proxy 212A-212B and manage one or more associated agent node 206A-206B, as will be described in further detail below.

The controller 108 may manage each data plane zone 220A-220B via a dedicated proxy 212A-212B as shown in FIG. 2. It is understood that there may be less than or more than two data plane zones in other embodiments. Cross domain communications, e.g., communications between the management plane 210 and the data plane zones 220A-220B, may be performed via the proxy 212A-212B and each dedicated data plane zone 220A-220B, e.g., network node 202A-202B and/or agent controller 214A-214B. Accordingly, zone-specific actions may be defined by the management plane 210 and dynamically managed throughout the system 200, as will be described in further detail below.

In some embodiments, management plane 210 communications may include policy, intelligence, distribution, and/or monitoring and/or statistics. For example, the controller 208 may transmit information including logging, events, and/or alerts to the SIEM 214. As another example, the controller 208 may perform workflow orchestration based on the security operations workflow system 215. As another example, the controller 208 may obtain threat scores from the intelligence scoring system 216. As yet another example, the controller 208 may communicate with the openflow controller 218 to determine optimal paths for network traffic. In some embodiments, management plane 210 communications may be encrypted.

In some embodiments, data plane communications may include communication between the agent controller 214A-214B and the agent node 206A-206B. An agent controller 214A may be configured to manage one or more agent nodes 206A within data plane zone 220A. The agent controller 214A may be configured to provide configuration management to agent node 206A and transmit image distribution and log aggregation information from the agent node 206 to the management plane 210 via zone proxy 212A. It is understood that data plane zone 220A may include two or more agent nodes each associated with a separate endpoint in other embodiments. In such embodiments, the agent controller 214A may be configured to manage the two or more agent nodes in data plane zone 220A.

Figure 3:
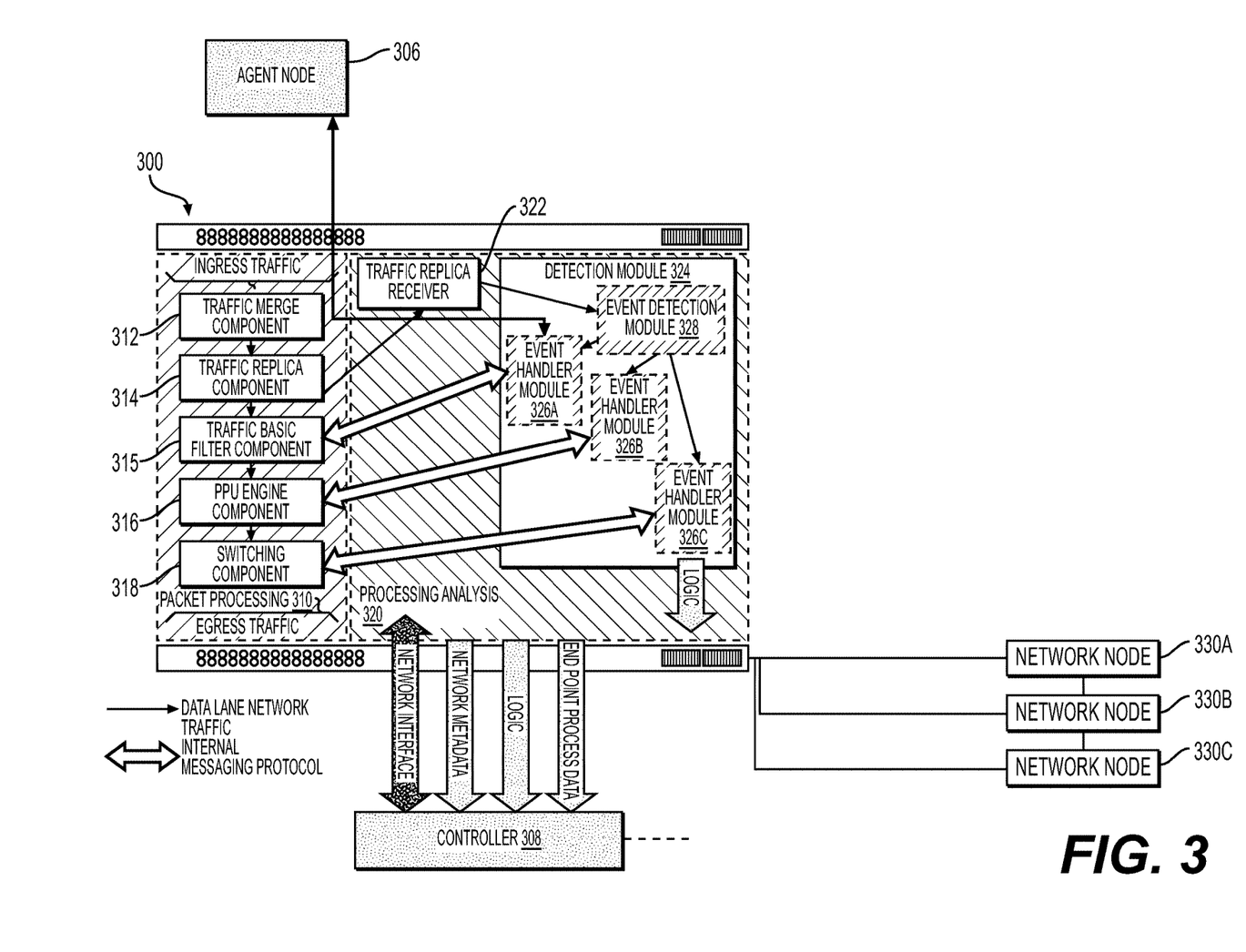
FIG. 3 depicts an exemplary network node according to embodiments of the present disclosure.

FIG. 3 depicts a network node 300, according to some embodiments. The network node 300 may include a packet processing engine 310 and a processing analysis engine 320, according to some embodiments. While only one processing analysis engine 320 is depicted in FIG. 3, it is understood that the network node 300 may include two or more processing analysis engines in other embodiments.

In some embodiments, the packet processing engine 310 may be deployed inline to a network. The packet processing engine 310 may receive ingress data packets, e.g., IPv4 and/or IPv6 data packets. In some embodiments, the packet processing engine 310 may include a traffic merge component 312 in which the received data packets may be temporarily stored. The packet processing engine 310 may forward each received data packet to the processing analysis engine 320. The packet processing engine 310 may include a traffic replica component 314 configured to generate a replica of each temporarily stored data packet. In some embodiments, the traffic replica component 314 may be configured to generate a pointer for each temporarily stored data packet. In such embodiments, the traffic replica component 314 may share the generated pointers with the processing analysis engine 320, thereby enabling the processing analysis engine 320 to use the generated pointers to access the stored data packets. In some embodiments, the traffic replica component 314 may generate a copy of each temporarily stored data packet. In such embodiments, the traffic replica component 314 may transmit the generated copies to the processing analysis engine 320.

The packet processing engine 310 may further include a traffic basic filter component 315 configured to check if one or more attributes associated with the temporarily stored data packets match predetermined attributes. For example, the predetermined attributes may include a source, destination IP, port, protocol, etc. In some embodiments, the predetermined attributes may be associated with data packets, sessions, and/or data flow that may be malicious, e.g., C2 and/or exfiltration malware. If attributes associated with one or more data packets do not match predetermined attributes, the one or more data packets may be forwarded to the intended destination via a switching component 318.

If attributes associated with the temporarily stored one or more data packets matches the predetermined attributes, a Packet Processing Unit (PPU) engine component 316 may be configured to perform a dynamic action on the one or more data packets, a session associated with the one or more data packets, and/or a data flow associated with the one or more data packets. In some embodiments, the PPU engine component 316 may comprise a micro-program that includes an activation rule and micro-compiled code that is executed if the activation rule matches. In some embodiments, the micro-compiled code may be executed to respond to, copy, drop, route, and/or modify the one or more data packets. In some embodiments, the PPU engine component 316 may further include state and memory useful for subsequent re-execution of the micro-program. The micro-program may further include executing a program, one or more data packets, a session, and/or a data flow based on the one or more data packets. The micro-program may comprise of both states and instructions. In some embodiments, the one or more data packets may be transparently routed to a deception server. In the context of the current disclosure, a deception server may be referred to a server that acts like a legitimate server for the purpose of gathering information about a malicious actor and/or entity (also referred to collectively as "adversary") including what the adversary is trying to exploit and where the adversary is trying to gather information from. For example, the deception server may be utilized to detect SQL injection attempts. In some embodiments, the one or more data packets may reflect un-allowed traffic to bad domains. In such embodiments, the one or more data packets may be detected and redirected without detection by an adversary. In some embodiments, the one or more data packets may reflect encrypted malware. In such embodiments, the threat may be mitigated by dropping the one or more data packets.

The packet processing engine 310 may communicate such performed dynamic actions to the controller 308 and/or one or more network nodes 330A-330C. In such embodiments, the controller 408 and/or the one or more network nodes 330A-330C may dynamically detect and mitigate similar data packets based on the communication.

The processing analysis engine 320 may include a traffic replica receiver 322 configured to receive replicas of the temporarily stored data packets for a deep analysis of the data packets, as will be described in further detail below. The data packet replicas may be utilized by the detection module 324, which may include an event detection module 328 and one or more event handler modules 326A-326C. The detection module 328 may be configured for a deep analysis of sessions, file extractions, intelligence correlation, and many other similar higher-level data signals analysis performed across multiple packet contexts including network and endpoint information. For example, the event detection module 328 may be configured to detect predetermined protocols and/or malware. In the context of the current disclosure, intelligence correlation may refer to identifying attributes associated with detected IPs, domains, C2s, and behaviors and utilizing such identified attributes to detect similar associated threats in other environments. Each detected protocol and/or malware may be referred to as an event, and the event handler modules 326A-326C may be configured to perform an analysis of an event. In some embodiments, an event handler module 326A may obtain information from an agent node 306 regarding an associated endpoint. The agent node 306 may provide visibility to a process, user information associated with executing the process, network and/or file state on the endpoint, and/or ownership of files such that the information gained by that visibility may be used by the event handler module 326A for detection and coordination with the packet processing engine 310. For example, the event handler module 326A may query for information, run scans for malware on demand, and/or collect process images. Each of the event handler modules 326A-326C may be configured to detect predetermined protocols and/or obtain PPUs based on mitigation and detection macro-logic. For example, the event handler modules 326A-326C may obtain and/or generate micro-programs that include an activation rule and micro-compiled code that may be executed if the activation rule matches. The event handler modules 326A-326C may deploy such micro-programs to the packet processing engine 310 (e.g., traffic basic filter component 315, PPU engine component 316, and/or switching component 318).

In some embodiments, the controller 308 may receive messages from the packet processing engine 310, the agent node 306, and the processing analysis engine 320 such that those messages may be processed, organized and redistributed to other connected components, such as other network nodes 330A-330C, based on predetermined policies. For example, the controller 308 may perform a security analysis of the network including the network node 300, log the analysis, and/or perform and protocol or malware analysis based on the received messages. In some embodiments, the received messages may include endpoint process data obtained from the agent node 306, network metadata, associated PPUs, etc.

Figure 4:
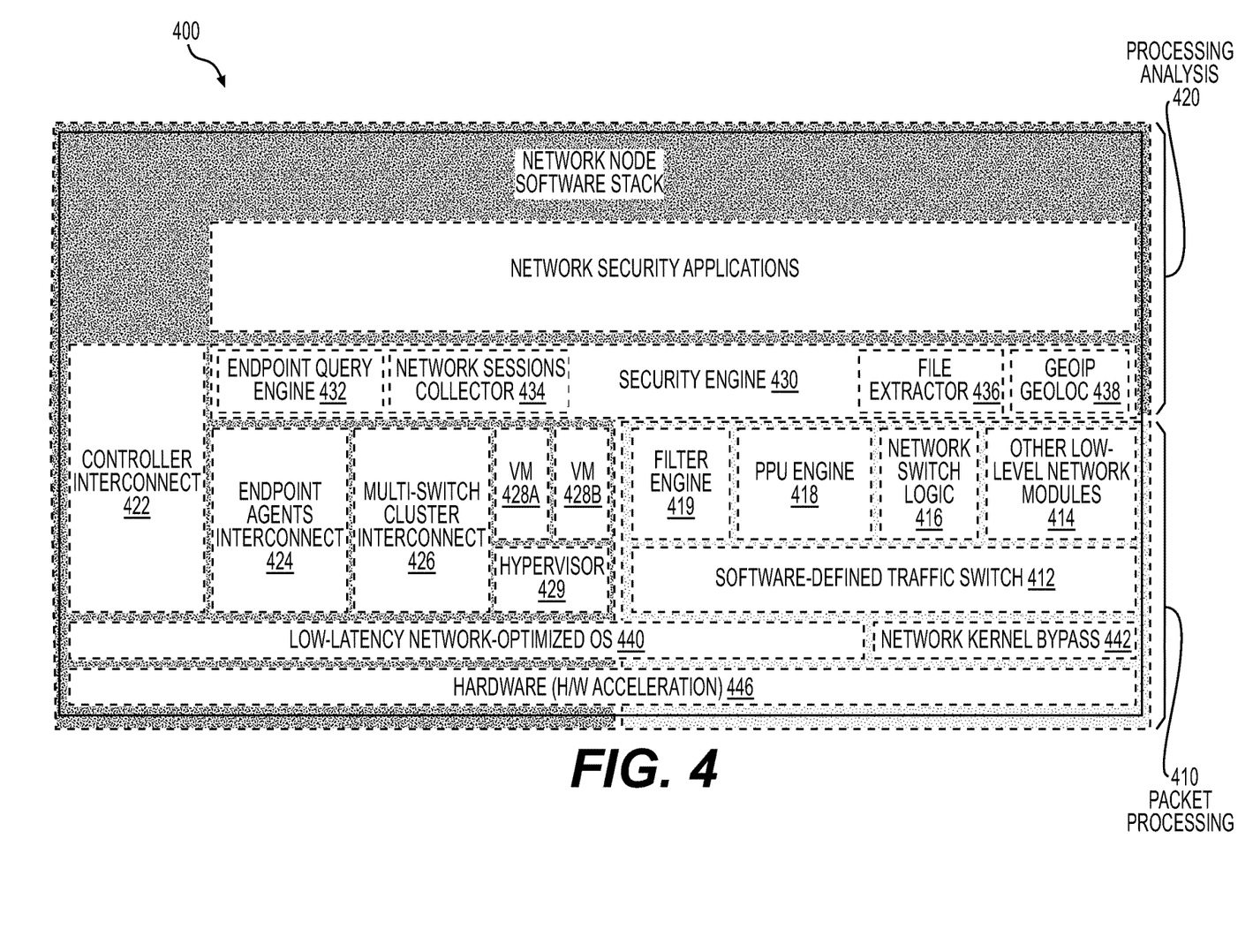
FIG. 4 depicts an exemplary network node architecture according to embodiments of the present disclosure.

FIG. 4 depicts an exemplary embodiment of a network node architecture 400 according to some embodiments. The modules, interfaces, and/or engines depicted in FIG. 4 may be implemented utilizing C, C++, hardware components, firmware, and/or compiled scripting languages, and any appropriate coding language. Accordingly, the network node architecture 400 as depicted in FIG. 4 may support both virtual and physical deployments. Network node 400 may include a low-latency network-optimized operating system 440 and hardware 446 for processing analysis 420 components and packet processing 410 components, as shown in FIG. 4. It is understood that the number of each component for processing analysis 420 and packet processing 410 shown in FIG. 4 may vary and the components may be rearranged in varying combinations in some embodiments.

Processing analysis 420 components may include network security applications 401, controller interconnect 422, endpoint agents interconnect 424, multi-switch cluster interconnect 426, hypervisor 429, one or more virtual machines 428A-428B, and security engine 430, according to some embodiments. Network security applications 401 may include one or more application may run on the network node 400 to analyze, detect, and/or mitigate threats, as described herein. Controller interconnect 422 may be configured to provide a connection between the network node 400 controller, e.g., security engine 430, and the rest of the system such as system 100 and 200 described above with reference to FIGS. 1 and 2. Endpoint agents interconnect 424 may be an agent controller as described above with reference to FIG. 2. As shown in FIG. 4, the endpoint agents interconnect 424 may be embedded on the network node 400 in some embodiments. In other embodiments, the endpoint agents interconnect 424 may be provided as a component separate from the network node 400, for example, as shown in FIG. 2. Multi-switch cluster interconnect 426 may be configured to logically interconnect multiple network nodes such that the network nodes may communicate and exchange data. For example, the exchanged data may be directed to information about detected malicious hosts or network sessions or about specific traffic routes such as updated network routing tables on each network node in order to deliver traffic correctly. Hypervisor 429 (also referred to as virtual machine monitor) may be computer software, firmware and/or hardware that creates and runs virtual machines 428A-428B. Security engine 430 may be referred to as a core service for security supporting the network security applications 401. For example, security engine 430 may include an endpoint query engine 432 configured to collect information from various endpoints, for example, using the endpoint agents interconnect 424. In some embodiments, the endpoint query engine 432 may be an interface configured to allow security applications to query various endpoints via agent nodes, as described herein. Security engine 430 may include a network sessions collector 434 configured to collect network sessions directed to and from the network node 400. Security engine 430 may include a file extractor 436 configured to extract files shared over the network. Security engine 430 may also include a geoIP and geolocation 438 interface configured to determine a geographic location of an IP address.

Packet processing 410 components may include a filter engine 419 and PPU engine 316 as described above with reference to FIG. 3. Packet processing 410 components may include a software defined traffic switch 412, network switch logic 416, network kernel bypass 442, and other low-level network modules 414, e.g., network traffic switching modules or network traffic routing modules. Network traffic switching modules may be configured to switch packets across multiple physical ports based on MAC address or IP. Network traffic routing modules may be configured to send packets to specific hosts based on IP. Software defined traffic switch 412 may be configured to provide software controlled network switching to allow directing traffic within a network node, e.g., the network node 400, between the various components and/or supporting multiple ports for a single network node, e.g., network node 400. Network switch logic 416 may be logic applied for routing of internal forwarding, e.g., data packet forwarding. Network kernel bypass 412 may allow routing of packets without delay and interference from the kernel.

Figure 5:
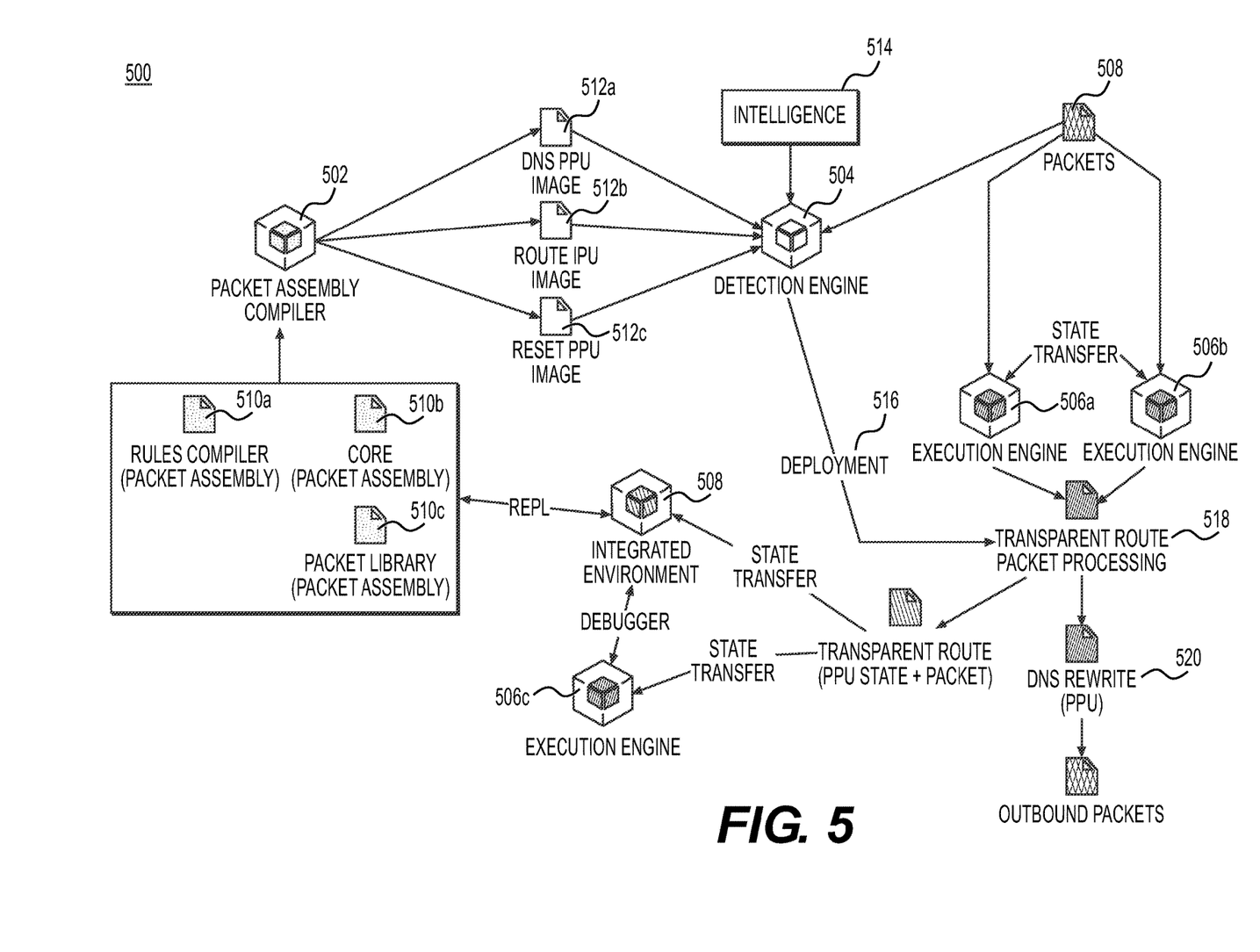
FIG. 5 depicts an exemplary flow chart depicting low latency deployment of threat detection and mitigation according to some embodiments

FIG. 5 depicts an exemplary flow chart 500 (hereinafter referred to as processing flow 500) depicting low latency deployment of threat detection and mitigation according to some embodiments. In some embodiments, the processing flow 500 may be performed by at least the following components: (1) a packet assembly compiler 502; (2) one or more detection engines 504 (e.g., processing analysis engine 320); (3) one or more execution engines 506a-506b (e.g., packet processing engine 310); and (4) an integrated environment 508. In some embodiments, the packet assembly compiler 502 may be included in the one or more controllers 108 and/or in the one or more endpoint 104A-104D, such as a development workstation, described above with reference to FIG. 1. In some embodiments, the integrated environment 508 may be included in the one or more controllers 108 and/or in the one or more endpoint 104A-104D, such as a development workstation, described above with reference to FIG. 1. The components will be explained in further detail below.

The packet assembly compiler 502 may be configured to convert logic and code, such as packet assembly 510a-510c, into states encapsulated as an image 512a-512c. In the context of the current disclosure, a packet assembly may refer to a packet processing stateful stack machine operation described in a stack oriented program language, e.g., Reverse Polish Notation (RPN) language. As shown in FIG. 5, a packet assembly may describe a compiler 510a, a core 510b, and/or a packet library 510c. The core 510b may be one or more core runtime API functions such as, for example, byte manipulation, input, output, and array access. The packet library 510c may be a set of API functions that may reconfigure data packets, e.g., Ethernet data packets, IP data packets, IPv6 data packets, among others. Reconfiguring data packets may include changing the address and/or alter a simple function call. The rules compiler 510a may be a rules matching gateway defined in a binary protocol definition, for example, written in ProtoBus. The rules compiler 510a may comprise a description of Boolean logic-capable criteria matching language that may be used to determine whether a packet processing unit (PPU) should be deployed on a data packet, as will be described in further detail below.

The packet assembly compiler 502 may obtain the one or more packet assemblies, e.g., 510a-510c, and generate one or more virtual machine bytecodes. In some embodiments, a generated virtual machine bytecode may be platform and architecture independent. The packet assembly compiler 502 may determine a program defined in the packet assembly 510a-510c and generate a binary image that encapsulates a runtime state, and a desired program logic. For example, the packet assembly compiler 502 may encapsulate the generated one or more virtual machine bytecodes in an image, e.g., 512a-512c. In the context of the current disclosure, an image may refer to an encapsulated snapshot of a stack machine operation including any associated registers, stacks, heap, and/or code. A generated image may be transmitted in a single network packet. For example, a generated image, e.g., 512a-512c, may be transmitted to a detection engine 504 as shown in FIG. 5. In some embodiments, the generated image may define an action for a specific data packet. For example, an encapsulated image 512a may define an action for performing a DNS rewrite for a specific data packet. As another example, an encapsulated image 512b may define an action for routing a specific data packet. As yet another example, an encapsulated image 512c may define an action for resetting a specific data packet.

A detection engine 504 (e.g., processing analysis engine 320) may be configured to determine whether an action should be taken on one or more specific packets. For example, the detection engine 504 may be configured to determine one or more attributes that may trigger a certain action for a specific data packet. Such attributes of a data packet may include a source, destination IP, port, protocol, etc. In some embodiments, such attributes may be associated with data packets, sessions, and/or data flow that may be malicious, e.g., C2 and/or exfiltration malware. In some embodiments, the detection engine 504 determine such attributes based on intelligence 514. For example, intelligence 514 may include information from SIEM 214, security operations workflow management system 215, intelligence scoring system 216, and/or openflow controller 218 as described above with reference to FIG. 2.

The detection engine 504 may also determine the action to be performed for an associated attribute. For example, the detection engine 504 may generate one or more microprograms (hereinafter referred to as a packet processing unit (PPU)) that include an activation rule (e.g., attributes that trigger a certain action) and micro-complied code that is executed if the activation rule matches. In some embodiments, the micro-compiled code may be executed to respond to, copy, drop, route, and/or modify the one or more data packets. In some embodiments, the micro-program may comprise of both states and instructions. For example, the micro-program may be a serialization of: (i) criteria that determines on which packets an action should take place; (ii) an associated image (e.g., 512a-512c) that may be altered and/or parameterized; and (iii) the intelligence that may be codified in the associated image that drives the action. In some embodiments, the intelligence may be codified in the associated image by parameterizing the image. For example, intelligence relevant to the one or more data packets may be retrieved and/or determined by the detection engine 504 and the detection engine 504 may determine a certain action for the one or more data packets. The micro-program may be generated accordingly and the image along with the criteria matching set for the relevant intelligence may be parameterized. As shown in FIG. 5, a PPU may be deployed 516 for one or more of the received data packets 508 as will be described in further detail below.

One or more execution engines 506a-506b (e.g., packet processing engine 310) may be deployed inline to a network as shown in FIG. 5. While only two execution engines 506a-506b are depicted in FIG. 5, it is understood that the processing flow 500 may include one or more than two execution engine in other embodiments.

An execution engine 506a may be configured to receive ingress data packets 508. The execution engine 506a may be configured to check if one or more attributes associated with the received data packets 508 match predetermined attributes. For example, the predetermined attributes may include a source, destination IP, port, protocol, etc. In some embodiments, the predetermined attributes may be associated with data packets, sessions, and/or data flow that may be malicious, e.g., C2 and/or exfiltration malware. In some embodiments, the execution engine 506a may obtain the associated PPU and apply the PPU to a data packet as a result of determining that attributes associated with data packet match the predetermined attributes. In some embodiments, the execution engine 506a may retrieve a pointer to the corresponding PPU. In some embodiments, applying the PPU may include executing the bytecode of the PPU describing the stack machine operation, updating a PPU state in response to the matching data packet, and transmitting the PPU state and the matching data packet to the integrated environment 508. For example, the PPU may be applied such that the matching data packet and updated PPU state are transparently routed to the integrated environment 508 as shown in FIG. 5. Additionally, the PPU may be applied such that the DNS for the matching data packet is rewritten 520 to produce a processed data packet as shown in FIG. 5. The processed data packet may then be transmitted as an outbound packet.

In some embodiments, the execution engine 506a may determine that the execution engine 506a is not capable of executing the action included in the obtained PPU. In such embodiments, the execution engine 506a may terminate the action and update an action state of the obtained PPU based on the terminated action and the matching data packet. The updated action state may include a contextual state of the data packet. The execution engine 506a may transfer the updated action state and the data packet to execution engine 506b capable of executing the action. The capable execution engine 506b may resume executing the action from the point of termination based on the updated action state and the received data packet.

As such, the execution engine 506a may perform a dynamic action on the received one or more data packets. As described above, the PPU may be a micro-program that includes an activation rule and micro-complied code that is executed if the activation rule matches. In some embodiments, the micro-compiled code may be executed to respond to, copy, drop, route, and/or modify the one or more data packets. In some embodiments, the execution engine 506a may further include state and memory useful for subsequent re-execution of the micro-program. The micro-program may further include executing a program, one or more data packets, a session, and/or a data flow based on the one or more data packets. The micro-program may comprise of both states and instructions.

As described above, a processed data packet and an updated PPU state may be transparently routed to the integrated environment 508. The integrated environment 508 (e.g., a network connected device of the network) may be configured to inspect and alter the received PPU states while preserving all inputs and outputs. For example, if an execution engine 506a had failed to execute a certain action, the integrated environment 508 may determine a cause for the termination based on the received PPU state and processed data packet. In some embodiments, the integrated environment 508 may inspect and/or debug the PPU state to produce source code updates that may allow the packet assembly compiler 502 to produce new encapsulated images. In such embodiments, the updated source codes may be stored as an updated packet assemblies. In some embodiments, the integrated environment 508 may utilize a separate execution engine 506c to debug the PPU state as shown in FIG. 5.

Based on the description above with reference to FIG. 5, an exemplary embodiment of a low latency deployment of threat detection and mitigation process is described as follows. An execution engine may accept a packet and extract packet metadata thereby obtaining packet attributes. The packet attributes may be compared against a predetermined set of attributes. As a result of determining a match between the packet attributes and the predetermined attributes, the execution engine may retrieve a pointer to a corresponding encapsulated PPU state. In some instances, the packet may be mapped to the PPU memory map, e.g., using pointers as explained above. The execution engine may resume the PPU execution from when execution last terminated. In instances in which the PPU is being first executed, the execution engine may initiate the execution upon receipt of the PPU.

In some instances, the execution engine may be associated with the following conditions: (i) a virtual machine fault or error condition, (ii) debugging mode is enabled, or (iii) PPU logic may issue a halt instruction. In such instances, the execution engine may generate a message including the packet attributes, the PPU state and the packet. In the case of the debugging mode or a fault/error condition, the message may further contain an entire state encapsulation necessary to reproduce the issue. In the case of a halt instruction, the PPU execute may be resumed at a separate execution engine that may be a more appropriate general purpose environment. In some embodiments, the message may be published to a publish-subscribe network. Upon completion of execution for a packet, the PPU logic may have altered to packet or produced new packets. As explained above, the resulting action may have been to respond to, copy, drop, route, and/or modify the packet.

A detection engine may determine that a PPU needs to be deployed. In such instances, the detection engine may publish a message that includes: (i) criteria required to execute the PPU, (ii) PPU encapsulating dynamic code and internal state initialized with parameters and intelligence, (iii) temporal metadata, and (iv) context of deployment. The detection engine may control the addition and/or removal of PPU by implicitly setting a time to life (TTL) or explicitly sending a publish-subscribe message to remove the PPU.

In some embodiments, debugging tools (e.g., integrated environment 508 and/or execution engine 506c of FIG. 5) may be part of the publish-subscribe network. The debugging tools may receive the encapsulated state from the execution engine based on the following conditions: (i) virtual machine execution errors, (ii) pausing of execution when a packet is completed processing, and/or (iii) instruction by instruction. Reporting tools may also be part of the publish-subscribe network that collect execution latency, bytes, and packets on a per PPU and/or per packet metadata basis.

Figure 6:
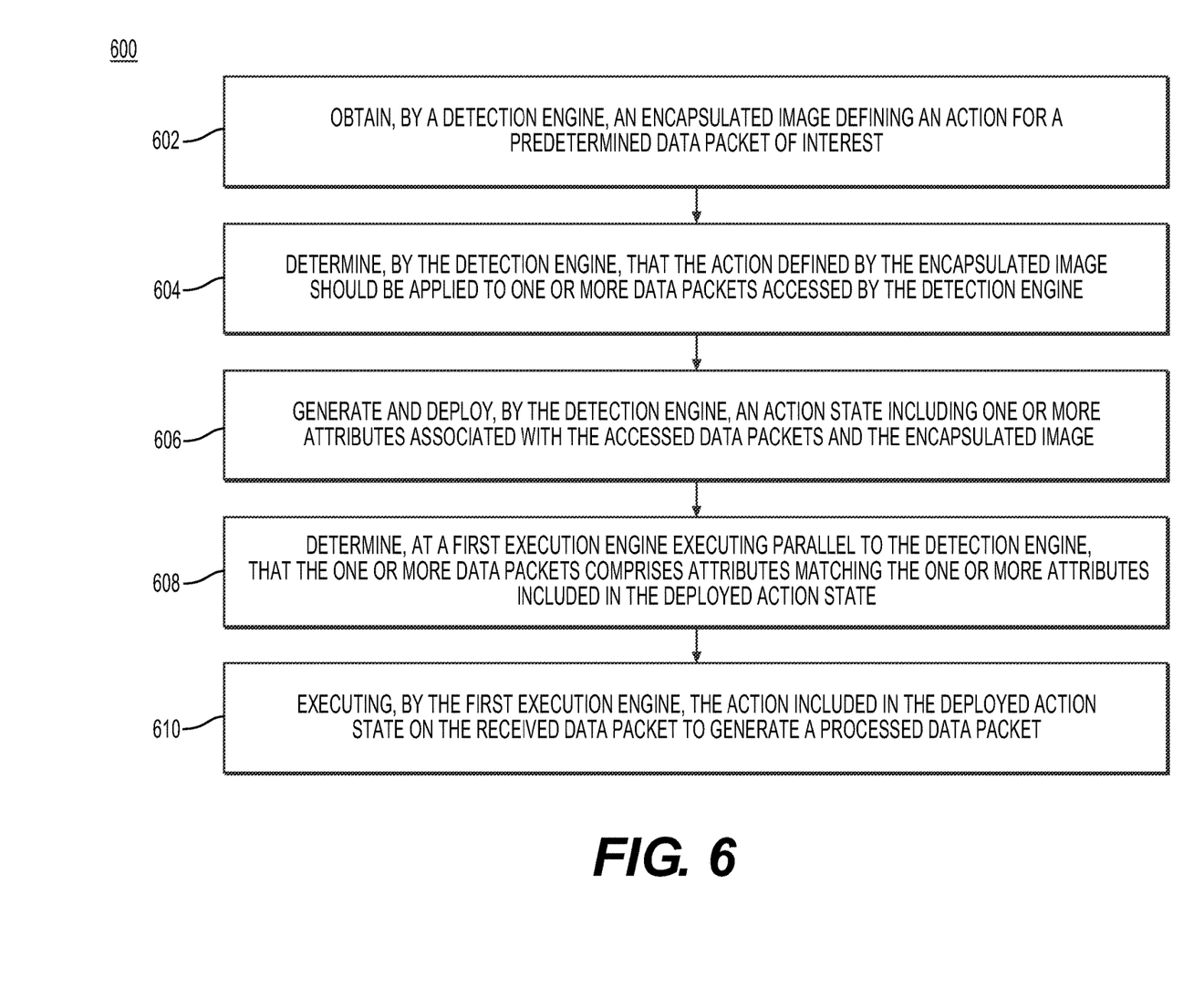
FIG. 6 depicts an exemplary method of securing a network, according to exemplary embodiments of the present disclosure.

FIG. 6 depicts an exemplary method 600 of securing a network according to some embodiments. The method 600 may begin with step 602 in which a detection engine obtains an encapsulated image defining an action for a predetermined data packet of interest. In step 604, the detection engine may determine that the action defined by the encapsulated image should be applied to one or more data packets accessed by the detection engine. In step 606, the detection engine may generate and deploy an action state including one or more attributes associated with the accessed data packet and the encapsulated image as a result of determining that the action defined by the encapsulated image should be applied to the accessed data packet. In some embodiments, deploying, by the detection engine, the action state may include determining a time to life (TTL) for the deployed action state.

In step 608, a first execution engine executing parallel to the detection engine may determine that the one or more data packets comprises attributes matching the one or more attributes included in the deployed action state. In step 610, the first execution engine may execute the action included in the deployed action state on a received data packet to generate a processed data packet. In some embodiments, the action may include one or more of the following: forwarding, dropping, redirecting, and/or rewriting, by the first execution engine, the received data packet.

In some embodiments, method 600 may include a further step in which the first execution engine may update the deployed action state based on the executed action. In such embodiments, the first execution engine may transmit the updated state and the processed data packet to a network connected device of the network configured to inspect the received updated action state and the processed data packet. In some embodiments, the first execution engine may transmit a message to a packet assembly compiler. The message may include the inspection of the received updated action state and the processed data packet. The packet assembly compiler may determine an updated action for the predetermined data packet of interest based on the message.

In some embodiments, method 600 may include a further step in which the packet assembly compiler may determine the action for the predetermined data packet of interest. In such embodiments, the packet assembly compiler may generate the encapsulated image defining the action. In some embodiments, the encapsulated image may comprise a stack machine snapshot.

In some embodiments, the first execution engine may determine that the first execution engine is not capable of executing the action included in the deployed action state. In such embodiments, the first execution engine may terminate the action and update the deployed action state based on the terminated action and the received data packet. In some embodiments, the updated action state may include a contextual state of the received data packet. In some embodiments, the execution engine may transfer the updated action state and the received data packet to a second execution engine capable of executing the action to execute the action. In some embodiments, the second execution engine may be configured to resume executing the action from the point of termination based on the updated action state and the received data packet. In some embodiments, the first execution engine may further generate a message including the updated action state and the received data packet and transmit the generated message to a network connected device to determine a cause for the termination based on the updated action state and the received data packet.

In some embodiments, the method 600 may include a further step in which the detection engine may receive external information regarding one or more predetermined data packets. In such embodiments, the detection engine may determine that the action defined by the encapsulated image should be applied to the accessed data packet based on the received external information.

Accordingly, the disclosed embodiments provide encapsulation of dynamic logic of an action as a stack machine to perform on packets with attributes that match predetermined attributes. The encapsulated dynamic logic is alterable, compilable, and deployable at network line rates. The embodiments disclosed herein provide, but is not limited to, the following advantages: (1) the encapsulation of dynamic actions that is transmittable in a single network packet payload, reducing latency from decision to action; (2) processor architecture Independence and ability to execute on a range from very small network processors to very large general purpose processors; (3) transmission of execution between heterogenous processors so that the more appropriate execution engine run; and (4) the ability to debug and introspect on state for development purposes.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A method of securing a network, the method comprising:
    obtaining, by a detection engine of at least one hardware processor, an encapsulated image defining an action for a predetermined data packet of interest, wherein the encapsulated image is an encapsulated snapshot of a stack machine operation including one or more of associated registers, stacks, heap, or code;
    determining, by the detection engine, that the action defined by the encapsulated image should be applied to one or more data packets accessed by the detection engine;
    as a result of determining that the action defined by the encapsulated image should be applied to the accessed data packet, generating and deploying, by the detection engine, an action state including one or more attributes associated with the accessed data packet and the encapsulated image;

determining, at a first execution engine of the at least one hardware processor, the first execution engine executing in parallel with the detection engine, that the one or more data packets comprises attributes matching the one or more attributes included in the deployed action state;

executing, by the first execution engine, the action included in the deployed action state on a received data packet to generate a processed data packet;

determining, by the first execution engine, that the first execution engine is not capable of executing the action included in the deployed action state;

terminating, by the first execution engine, the action; and updating, by the first execution engine, the deployed action state based on the terminated action and the received data packet, wherein the updated action state includes a contextual state of the received data packet.

2. The method of claim 1, further comprising:
updating, by the first execution engine, the deployed action state based on the executed action; and
transmitting, by the first execution engine, the updated action state and the processed data packet to a network connected device of the network configured to inspect the received updated action state and the processed data packet.

3. The method of claim 1, further comprising:
determining, by a packet assembly compiler, the action for the predetermined data packet of interest; and
generating, by the packet assembly compiler, the encapsulated image defining the action.

4. The method of claim 1, wherein the action comprises one or more of:
forwarding, dropping, redirecting, or rewriting, by the first execution engine, the received data packet.

5. The method of claim 1, further comprising:
transferring, by the first execution engine, the updated action state and the received data packet to a second execution engine to execute the action, wherein the second execution engine is capable of executing the action, and wherein the second execution engine is configured to resume executing the action from the point of termination based on the updated action state and the received data packet.

6. The method of claim 1, further comprising:
generating, by the first execution engine, a message including the updated action state and the received data packet; and
transmitting, by the first execution engine, the generated message to a network connected device to determine a cause for the termination based on the updated action state and the received data packet.

7. The method of claim 2, further comprising:
transmitting, by the network connected device, a message to a packet assembly compiler, the message including the inspection of the received updated action state and the processed data packet; and
determining, by the packet assembly compiler, an updated action for the predetermined data packet of interest based on the message.

8. The method of claim 1, wherein deploying, by the detection engine, the action state comprises determining a time to live (TTL) for the deployed action state.

9. The method of claim 1, further comprising:
receiving, by the detection engine, external information regarding one or more predetermined data packets; and
determining, by the detection engine, that the action defined by the encapsulated image should be applied to the accessed data packet based on the received external information.

10. A system for securing a network, the system comprising:
at least one hardware processor including:
a detection engine configured to:
obtain an encapsulated image defining an action for a predetermined data packet of interest, wherein the encapsulated image is an encapsulated snapshot of a stack machine operation including one or more of associated registers, stacks, heap, or code,
determine that the action defined by the encapsulated image should be applied to one or more data packets accessed by the detection engine, and
generate and deploy an action state including one or more attributes associated with the accessed data packet and the encapsulated image as a result of determining that the action defined by the encapsulated image should be applied to the accessed data packet; and
a first execution engine configured to execute in parallel with the detection engine:
determine that the one or more data packets comprises attributes matching the one or more attributes included in the deployed action state, and
execute the action included in the deployed action state on a received data packet to generate a processed data packet,
determine that the first execution engine is not capable of executing the action included in the deployed action state,
terminate the action, and
update the deployed action state based on the terminated action and the received data packet, wherein the updated action state includes a contextual state of the received data packet.

11. The system of claim 10, wherein the first execution engine is further configured to:
update the deployed action state based on the executed action; and
transmit the updated action state and the processed data packet to a network connected device of the network configured to inspect the received updated action state and the processed data packet.

12. The system of claim 10, further comprising:
a packet assembly compiler configured to: determine the action for the predetermined data packet of interest, and generate the encapsulated image defining the action.

13. The system of claim 10, wherein the action comprises one or more of:
forwarding, dropping, redirecting, or rewriting, by the first execution engine, the received data packet.

14. The system of claim 10, wherein the first execution engine is further configured to:
transfer the updated action state and the received data packet to a second execution engine to execute the action, wherein the second execution engine is capable of executing the action, and wherein the second execution engine is configured to resume executing the action from the point of termination based on the updated action state and the received data packet.

15. The system of claim 10, wherein the first execution engine is further configured to:

generate a message including the updated action state and the received data packet; and transmit the generated message to a network connected device to determine a cause for the termination based on the updated action state and the received data packet.

16. The system of claim 11, wherein the network connected device is further configured to transmit a message to a packet assembly compiler, the message including the inspection of the received updated action state and the processed data packet, and wherein the packet assembly compiler is further configured to determine an updated action for the predetermined data packet of interest based on the message.

17. The system of claim 10, wherein deploying, by the detection engine, the action state comprises determining a time to life (TTL) for the deployed action state.

18. The system of claim 10, wherein the detection engine is further configured to:

receive external information regarding one or more predetermined data packets; and determine that the action defined by the encapsulated image should be applied to the accessed data packet based on the received external information.

* * * * *